Dec. 10, 1929.  P. J. HAMILTON ET AL  1,738,996
HOSE COUPLING
Filed March 17, 1927

INVENTORS
Peter J. Hamilton
Leon F. Meunier

BY  Ira L. Nickerson
ATTORNEY.

Patented Dec. 10, 1929

1,738,996

UNITED STATES PATENT OFFICE

PETER J. HAMILTON AND LEON F. MEUNIER, OF CLEVELAND, OHIO, ASSIGNORS TO CHICAGO PNEUMATIC TOOL COMPANY, OF NEW YORK, N. Y., A CORPORATION OF NEW JERSEY

HOSE COUPLING

Application filed March 17, 1927. Serial No. 175,995.

This invention relates to means for detachably connecting flexible conduits and in particular to hose couplings of the universal type in which the mating members are of identical shape.

Among the objects of the invention are to protect the engaging and holding parts of such devices against injury and wear, to avoid external projections which will catch when the conduit is dragged along, and in general to improve prior devices and constructions in the interest of more efficient and satisfactory service.

In order to illustrate the invention one concrete embodiment thereof is shown in the accompanying drawings in which.

Figure 1:
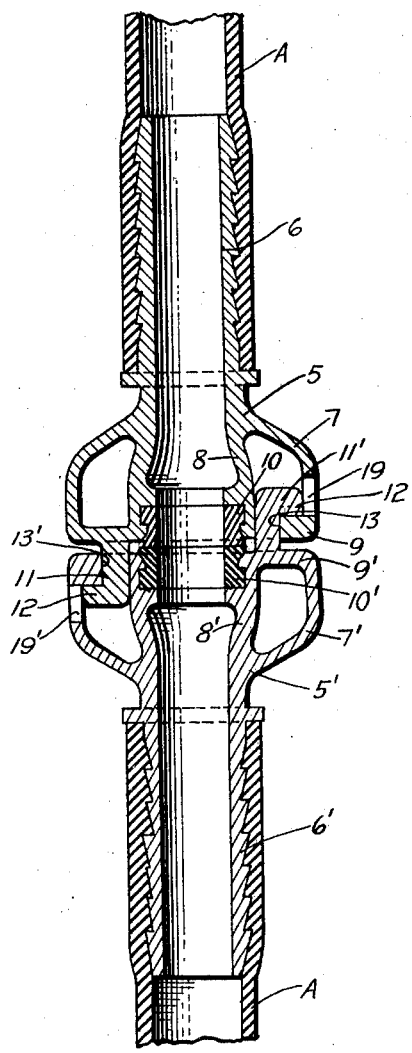
Fig. 1 is a longitudinal sectional view through a coupling and the adjacent portions of a fluid conduit, the section being substantially on the line 1—1 of Fig. 2.
Figure 3:
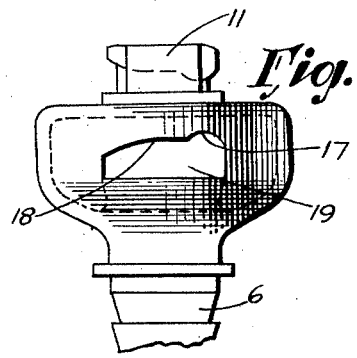
Figs. 3 and 4 are elevational views taken from opposite sides of the same member.
Figure 4:
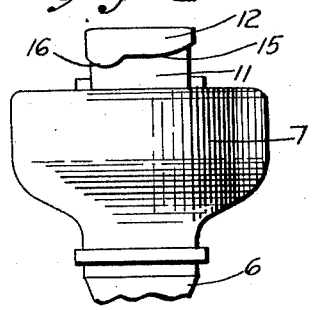

As illustrated the duplicate coupling members 5 and 5' have hollow ribbed extensions 6 and 6', to which the ends of the fluid conruit such as hose A, are adapted to be secured. The duplicate members take the form of enlarged terminals for the fluid conduit, which terminals may be generally bell shaped as shown. These enlarged terminal ends are hollow being formed by annular walls 7 and 7' diverging from the inner walls 8 and 8' (which form the fluid conduit) and in spaced relation thereto and terminating in opposed transverse walls 9 and 9'. The inner walls 8 are counterbored from their outer ends to receive annular gasket members 10 and 10' of rubber or other suitable resilient or flexible material, these gaskets projecting beyond the outer faces of walls 9 and 9' as indicated in Figs. 1, 3 and 4.

Figure 2:
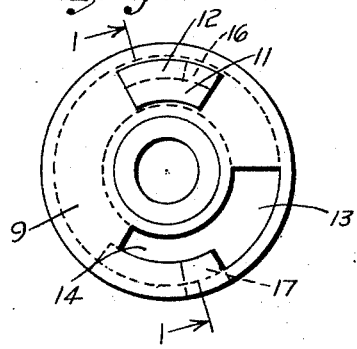
Fig. 2 is a top plan view of one of the duplicate members of the coupling.

The means by which the mating members 5 and 5' are brought into engaging and interlocking relation so as to force gaskets 10 and 10' into wedging and fluid tight engagement are supported upon and directly associated with the opposed transverse walls 9 and 9'. Each coupling member has at least one locking lug 11 or 11' projecting axially from and beyond its transverse wall 9 or 9'. These lugs have an overhanging portion 12 or 12'. Each member further has at least one slot 13 or 13' in its transverse wall 9 or 9' to receive the lugs of the opposed member, the slots being arcuate as shown in Fig. 2 and restricted at 14 so that the overhanging portion of the opposing lug will engage the inner face of the transverse wall 9 and lock the members together. In the present instance each terminal member has one lug and one slot. By preference the overhanging portion of each lug is inclined as indicated at 15 in Fig. 4 to cooperate with the inner face of the transverse wall of the opposing member adjacent the restricted portion of the slot. The cam portion 15 of each lug also preferably terminates in a latching projection 16 which corresponds with a similar depression 17 in a thickened portion of the inner face of the transverse wall of the opposing member and this socket is followed by a further built up curved camming surface 18 to correspond with the camming surface 15 of the lug.

In order to connect the coupling, the duplicate members are brought into face engagement with the lug of each, so disposed as to project through the large portion of the opposing slot. The two members are then gripped and given a partial twist to cause the overhanging portions of the lugs to ride up upon the camming portions of the inner faces of the opposing walls adjacent the restricted portions of the slots until the locking projections 16 snap into the socket 17. This action has drawn the two coupling members together and wedged the gaskets 10 and 10' into fluid tight engagement. The connection is disconnected by reversing the above steps. Each of the coupling members 5 and 5' is provided with a window 19 or 19' opposite the restricted portion of its slot in order to provide means for determining whether the coupling members are in locking engagement or not.

From the above it will be apparent that the coupling device of the present invention provides an enlarged hollow head or terminal which completely houses and protects the inter-engaging means, such as the locking lugs which project axially through the transverse end wall of the member to engage the inner face thereof in the hollow space between the walls of the terminal or head, that the terminal has an opening permitting visual inspection of the position of the locking lug to make it possible to know at all times whether the coupling members are in locking engagement, and that the outer walls of the terminal members are so shaped as to avoid catching on objects when the conduit is dragged along and effectively to protect the inter-engaging latching members against wear and injury.

While a preferred form of the invention has been herein shown and described, it is to be understood that the invention is not limited to the specific details thereof, but covers all changes, modifications and adaptations within the scope of the appended claim.

We claim as our invention:

A coupling member adapted to be used in duplicate to connect a conduit, said member having a portion to be secured to the conduit and a bell shaped hollow terminal having a transverse end wall, an arcuate locking lug projecting axially from said wall and having an outwardly overhanging portion providing a cam surface terminating in a latching projection, said wall having a slot to receive a similar lug on a duplicate member, the slot having a reduced portion to enable the overhanging portion of the lug to engage the inner face of said wall, said wall providing a cam surface and a depression to cooperate with the cam surface and projection on the lug, said terminal having an opening in its outer wall adjacent the restricted portion of said slot to permit visual inspection of the inner face of said transverse wall.

Signed by us at Cleveland, county of Cuyahoga, State of Ohio, this 15th day of March 1927.

PETER J. HAMILTON.
LEON F. MEUNIER.